United States Patent
Krasnov et al.

(10) Patent No.: US 9,499,436 B2
(45) Date of Patent: Nov. 22, 2016

(54) LIGHT SCATTERING COATING FOR GREENHOUSE APPLICATIONS, AND/OR COATED ARTICLE INCLUDING THE SAME

(75) Inventors: Alexey Krasnov, Canton, MI (US); Willem Den Boer, Brighton, MI (US); Scott V. Thomsen, South Lyon, MI (US); Jean-Marc Lemmer, Ann Arbor, MI (US)

(73) Assignee: Guardian Industries Corp., Auburn Hills, MI (US)

( * ) Notice: Subject to any disclaimer, the term of this patent is extended or adjusted under 35 U.S.C. 154(b) by 1029 days.

(21) Appl. No.: 13/064,600

(22) Filed: Apr. 1, 2011

(65) Prior Publication Data

US 2012/0251773 A1 Oct. 4, 2012

(51) Int. Cl.
C03C 17/34 (2006.01)
C03C 15/00 (2006.01)
G02B 1/10 (2015.01)
G02B 5/02 (2006.01)
A01G 9/14 (2006.01)
F24J 2/40 (2006.01)
F24J 2/50 (2006.01)

(52) U.S. Cl.
CPC ......... C03C 17/3417 (2013.01); A01G 9/1438 (2013.01); C03C 15/00 (2013.01); G02B 1/10 (2013.01); G02B 5/021 (2013.01); G02B 5/0268 (2013.01); G02B 5/0278 (2013.01); C03C 2218/32 (2013.01); F24J 2/407 (2013.01); F24J 2/505 (2013.01); Y10T 428/24355 (2015.01)

(58) Field of Classification Search
USPC ....................................... 428/141
See application file for complete search history.

(56) References Cited

U.S. PATENT DOCUMENTS

| 6,123,824 | A | 9/2000 | Sano et al. | |
|---|---|---|---|---|
| 6,531,230 | B1* | 3/2003 | Weber et al. | 428/480 |
| 6,797,366 | B2* | 9/2004 | Hanson et al. | 428/201 |
| 7,138,173 | B2* | 11/2006 | Wheatley et al. | 428/212 |
| 7,851,054 | B2* | 12/2010 | Weber et al. | 428/220 |
| 2003/0035972 | A1* | 2/2003 | Hanson et al. | 428/480 |
| 2005/0079333 | A1* | 4/2005 | Wheatley et al. | 428/212 |
| 2007/0030569 | A1 | 2/2007 | Lu et al. | |
| 2007/0184274 | A1* | 8/2007 | Wheatley et al. | 428/411.1 |
| 2009/0194157 | A1 | 8/2009 | Den Boer et al. | |
| 2009/0323180 | A1* | 12/2009 | Weber et al. | 359/359 |

(Continued)

OTHER PUBLICATIONS

U.S. Appl. No. 12/923,146, filed Sep. 3, 2010; Broadway et al.

(Continued)

Primary Examiner — Nathan Van Sell
(74) Attorney, Agent, or Firm — Nixon & Vanderhye P.C.

(57) ABSTRACT

Certain example embodiments relate to a sunlight-scattering thin-film coating disposed on a substrate for greenhouse applications. The surface morphology of the coating promotes a better and more uniform light distribution. For instance, at least one thin-film layer disposed on a substrate may be textured so as to create surface features on the order of 0.1-5 microns, with the surface features being sized to cause (a) light having a wavelength of greater than or equal to about 800 nm incident thereon to primarily scatter to angles less than 30 degrees relative to a major surface of the substrate and (b) light having a wavelength of less than or equal to about 700 nm incident thereon to primarily scatter to angles greater than 20 degrees relative to the major surface of the substrate. This arrangement may advantageously direct beneficial light towards plant life while directing parasitic light away from the plant life.

11 Claims, 3 Drawing Sheets

(56) References Cited

U.S. PATENT DOCUMENTS

2010/0101649 A1    4/2010   Huignard et al.
2010/0180939 A1    7/2010   Sharma et al.

OTHER PUBLICATIONS

U.S. Appl. No. 12/929,481, filed Jan. 27, 2011; Broadway et al.
U.S. Appl. No. 12/929;464; filed Jan. 26, 2011; Krasnov.

* cited by examiner

Greenhouse Interior

LIGHT SCATTERING COATING FOR GREENHOUSE APPLICATIONS, AND/OR COATED ARTICLE INCLUDING THE SAME

Certain example embodiments of this invention relate to a light scattering coating for greenhouse applications, a coated article including the same, and/or methods of making the same. More particularly, certain example embodiments of this invention relate to a sunlight-scattering thin-film coating disposed on a substrate for greenhouse applications, in which a micron-scale surface morphology of the coating promotes a better and more uniform light distribution. In certain embodiments, transmitted light with long wavelengths is primarily scattered to angles less than about 30 degrees relative to the plane of the substrate, while transmitted light with shorter wavelengths is primarily scattered to angles greater than about 20 degrees relative to the plane of the substrate.

BACKGROUND AND SUMMARY OF EXAMPLE EMBODIMENTS OF THE INVENTION

Greenhouses are known. Typically, window glass for greenhouse applications is fabricated to meet several needs. These needs often include, for example, maximum visible light transmission, the scattering of unwanted infrared (IR) wavelengths to the shallow angles for their dissipation, and/or the scattering of the visible light components to steeper angles to provide their effective absorption by the plants.

Textured glass has been used for greenhouse windows. The textured morphology of the glass is normally achieved by chemical etching using HF-based solutions or by mechanical treatment, such as sand blasting.

Both chemical and mechanical treatments, however, often result in individual features of the textured surface having sizes on the order of tens or hundreds of microns. FIG. 1, for example, is an image showing the surface texture of chemically etched float glass. Unfortunately, this rather uniform sizing promotes considerable light scattering of all components of sunlight according to the laws of geometric optics. It is known, however, that the most useful wavelengths of sunlight in greenhouse applications are those between about 300-800 nm, which are responsible for morphogenesis. This includes those wavelengths between about 400-700 nm that are responsible for photosynthesis of the plants. Wavelengths that are greater than about 800 nm are considered parasitic by those skilled in the art because they are responsible for the generally unwanted increase in the greenhouse temperature.

Thus, it will be appreciated that it would be desirable to achieve a more preferential scattering of the IR components to the shallow angles and the visible light components to steeper angles relative to the glass substrate.

Certain example embodiments of this invention relate to a coated article comprising a coating supported by a substrate. The coating includes at least one thin-film layer that is textured so as to have surface features on the order of 0.3-3 microns that cause (a) light having a wavelength of greater than or equal to about 800 nm incident thereon to primarily scatter to angles less than 30 degrees relative to a major surface of the substrate and (b) light having a wavelength of less than or equal to about 700 nm incident thereon to primarily scatter to angles greater than 20 degrees relative to the major surface of the substrate.

Certain example embodiments of this invention relate to a coated article comprising a coating supported by a substrate. The coating includes at least one crystalline or polycrystalline thin-film layer that is textured so as to have micron- and/or sub-micron surface features that cause (a) light having a wavelength of greater than or equal to about 800 nm incident thereon to primarily scatter to angles less than 30 degrees relative to a major surface of the substrate and (b) light having a wavelength of less than or equal to about 700 nm incident thereon to primarily scatter to angles greater than 20 degrees relative to the major surface of the substrate.

Methods of making these and/or other coated articles are provided. For instance, certain example embodiments of this invention relate to a method of making a greenhouse window. A coating including at least one thin-film layer is disposed on a substrate. The at least one thin-film layer is textured so as to create surface features on the order of 0.3-3 microns, with the surface features being sized to cause (a) light having a wavelength of greater than or equal to about 800 nm incident thereon to primarily scatter to angles less than 30 degrees relative to a major surface of the substrate and (b) light having a wavelength of less than or equal to about 700 nm incident thereon to primarily scatter to angles greater than 20 degrees relative to the major surface of the substrate.

The features, aspects, advantages, and example embodiments described herein may be combined to realize yet further embodiments.

DETAILED DESCRIPTION OF THE INVENTION

Figure 1:
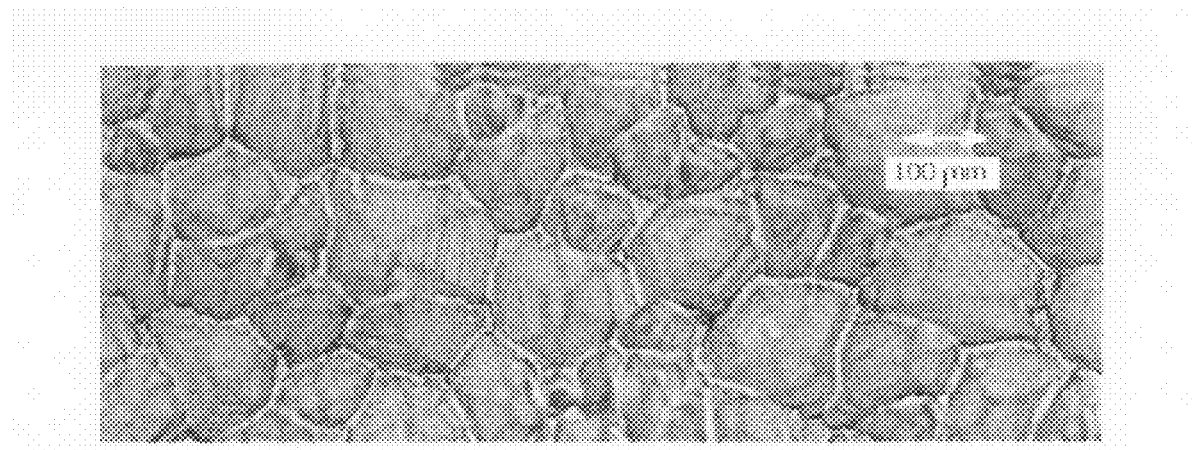
FIG. 1 is an image showing the surface texture of chemically etched float glass.

Referring now to the drawings in which like reference numerals indicate like parts throughout the several views.

Certain example embodiments relate to a sunlight-scattering thin-film coating disposed on a substrate for greenhouse applications. The micron-scale surface morphology of the coating advantageously allows advanced scattering of the thermal infrared (IR) solar light to reduce the heat load while also providing improved conditions for diffuse blue, visible, and near-IR light. The diffuse component reduces the shadowing effect and promotes a better and more uniform light distribution, which potentially aids in the development of plant life within the greenhouse while also keeping temperatures therein comparatively lower.

Figure 2:
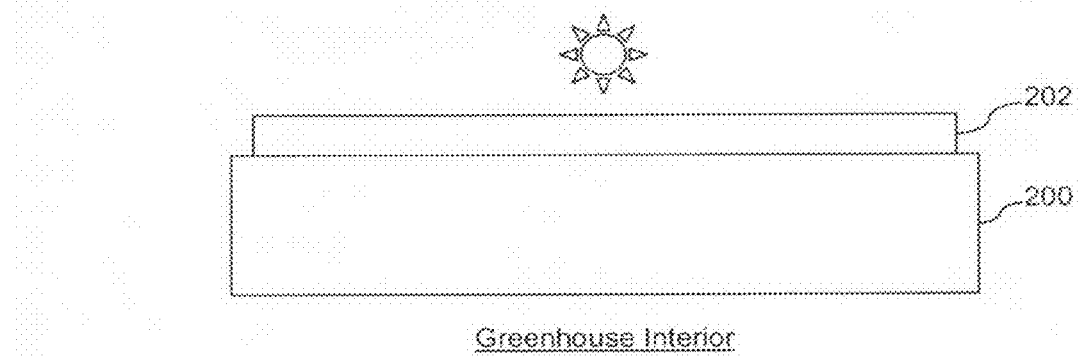
FIG. 2 is a cross-sectional view of a coated article in accordance with certain example embodiments.

FIG. 2 is a cross-sectional view of a coated article in accordance with certain example embodiments. As shown in FIG. 2, a substrate 200 supports a thin-film coating 202. The substrate 200 may be a glass substrate (e.g., a float glass substrate, a borosilicate glass substrate, etc.) or any other transparent substrate (e.g., of or including plastic, etc.). The coating 202 may be a single layer or a multi-layer coating.

In the case of single layer coatings, for example, crystalline or polycrystalline thin-films may be used in certain example embodiments. Of course, other single layer coatings may include thin films with other crystallinities. In addition, multiple layer thin film coatings may include one or more crystalline or polycrystalline thin-films of the same or different materials.

The thin-film coating 202 may have a high refractive index (n) in certain example embodiments. For instance, in certain example embodiments, the refractive index of the thin-film coating 202 preferably will be in the range of about 1.8-2.2 (at 550 nm), more preferably about 1.9-2.1 (at 550 nm). The thickness of the coating 202 in certain example embodiments may be about 100-10,000 nm, more preferably 200-1,000 nm.

A combination of micron- and/or sub-micron-size features in the coating 202 are achievable in a manner similar to that used for light scattering in some amorphous silicon thin-film solar cells. See, for example, A. Krasnov, "Light scattering by textured transparent electrodes for thin-film silicon solar cells," Solar Energy Materials & Solar Cells, 94 (2010), pp. 1648-1657, the entire contents of which are incorporated herein by reference. See also application Ser. No. 12/929,464, the entire contents of which also are incorporated herein by reference.

Unlike the solar cell concept, however, coatings for greenhouse applications do not need to be conductive. This alleviates difficulties associated with achieving a better transparency without losing the conductivity, which is a common issue in the solar cell industry. For similar reasons, transparent coatings in greenhouse applications do not need to be thick or doped. For instance, pyrolytic tin oxide may be grown to only about 300-500 nm thick, and possibly only 200-250 nm thick, to be sufficiently textured. The ability to use comparatively thinner layers may reduce the overall cost of the coating.

Figure 3:
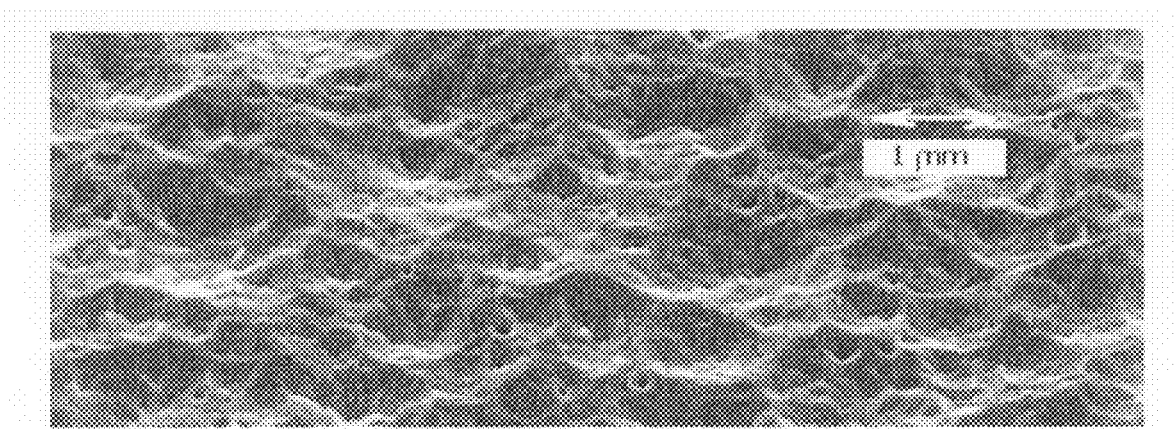
FIG. 3 is an image showing the surface texture of chemically etched crystalline zinc oxide in accordance with certain example embodiments.

FIG. 3 is an image showing the surface texture of chemically etched crystalline zinc oxide in accordance with certain example embodiments. In certain example embodiments, the feature size of the coating may be on the order of 0.1-5 microns, more preferably on the order of 0.3-3 microns. It will, of course, be appreciated that other feature sizes may be used in different embodiments. For instance, certain example embodiments may involve features sizes of 200-3000 nm, more preferably 300-3000 nm. The feature sizes may depend, for instance, on the material(s) used in the coating 202. The feature size as discussed herein relates to a diameter or distance across a roughened region of the coating.

In certain example embodiments, the coating 202 may be deposited using a pyrolytic technique. The process conditions of the pyrolytic technique may be selected so as to create a "natural" texture in the coating as a result of the technique itself. In other words, in certain example embodiments, a pyrolytically deposited layer may be naturally textured with the desired feature size(s) so that subsequent texturing is not necessary. In certain example embodiments, however, pyrolytically formed, sputter-deposited, or otherwise disposed layers may be formed on the substrate 200 and subsequently textured. In certain example embodiments, subsequent texturing may be accomplished using a chemical solution, mechanically, and/or via other means.

As alluded to above, the coating 202 may be doped or undoped. In certain example embodiments, a crystalline thin-film coating may include one or more layers of or including tin oxide, zinc oxide, combinations of zinc oxide and tin oxide, and/or any other suitable texturable crystalline or polycrystalline material.

In example embodiments where multilayer coatings 202 are provided, protective overcoats of or including zirconium (e.g., zirconium oxide), silicon (e.g., silicon oxide, silicon nitride, silicon oxinitride, etc.), DLC, and/or the like may be used. In certain example embodiments, a photocatalytic material (such as anatase $TiO_2$ or the like) may be disposed over the textured material to provide for self-cleaning and/or other features.

Figure 4:
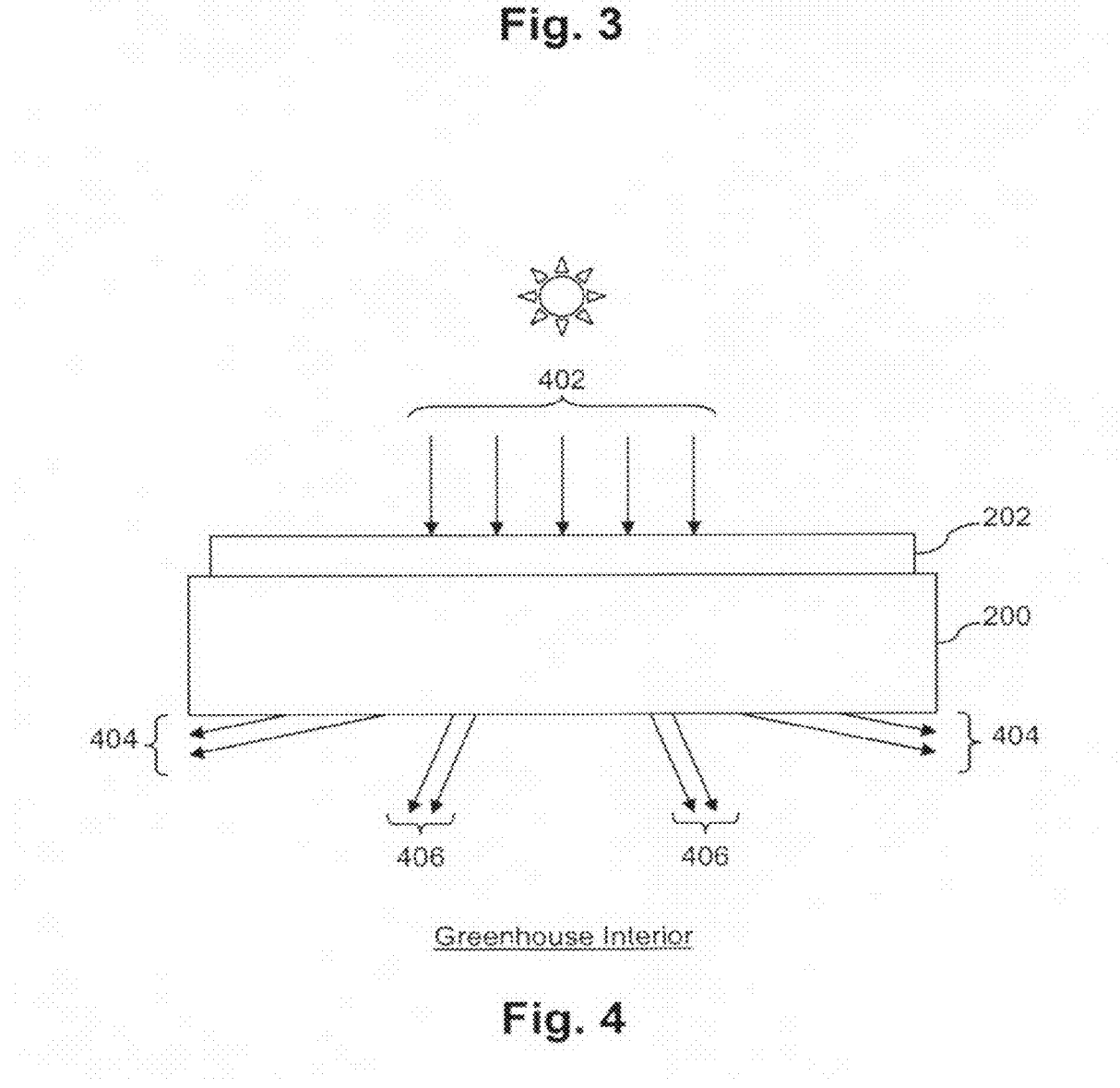
FIG. 4 is a schematic view illustrating operational principles of certain example embodiments.

FIG. 4 is a schematic view illustrating operational principles of certain example embodiments. In the FIG. 4 embodiment, the coating 202 is disposed on an outer major surface of the substrate 200. Light 402 incident on the coating is influenced by the features of the coating 202. More particularly, long wavelength light preferably is scattered along first, low angles relative to the inner major surface of the substrate 200, whereas shorter wavelength light (e.g., in the visible range) is preferably scattered along second angles that are greater than the first, low angles, or not scattered very much at all. In certain example embodiments, transmitted near-infrared and infrared light 404 (e.g., light having a wavelength greater than or equal to about 700 nm) preferably is primarily scattered to angles less than about 30 degrees relative to the plane of the glass. In certain example embodiments, transmitted near-infrared and infrared light 404 having a wavelength greater than or equal to about 800 nm is primarily scattered to angles less than 20 degrees relative to the plane of the glass. By contrast, light 406 having a wavelength less than or equal to about 800 nm is primarily scattered to angles greater than about 20 degrees relative to the plane of the glass.

In certain example instances, light at a particular wavelength or in a particular wavelength range is "primarily scattered" to a particular range of angles if at least a majority of light at that wavelength or wavelength range is scattered within that particularly described range of angles. Of course, higher percentages of scattering beyond a simple majority may be desirable in certain example embodiments. For instance, in certain example embodiments, it may be desirable to scatter 60%, 75%, 80%, or more light at a particular wavelength or wavelength range.

In certain example embodiments, solar light transmission preferably exceeds 85%, more preferably 90%. Despite the high total solar light transmission, example embodiments are still advantageous, for example, because of the patterns of light, e.g., in which long wavelength light that is generally viewed as detrimental to plant growth is primarily scattered along low angles close to an inner surface of the substrate whereas shorter wavelength light that is generally viewed as beneficial to plant growth is primarily scattered along greater angles.

It will be appreciated that a single-layer or multi-layer antireflective (AR) or color compression coating may be provided between the textured coating 202 and the substrate 200, e.g., to enhance the optical transmission. Any suitable material(s) may be used in this regard, and the AR coatings may be disposed by any suitable technique(s). See, for example, U.S. Publication No. 2007/0030569 (directed to a broad band AR coating), and U.S. application Ser. Nos. 12/923,146 and 12/929,481 (directed to three- and four-layer AR coatings, respectively). The entire contents of each of these references are hereby incorporated herein by reference.

Example ranges for the thicknesses of each layer of an example three-layer AR coating are as follows:

Example Materials/Thicknesses for Example Three Layer AR Coating

| Layer | Range(nm) | More Preferred(nm) | Example(nm) |
|---|---|---|---|
| $SiO_xN_y$ | 75-135 nm | 94-115 nm | 95 nm |
| $TiO_x$ | 10-35 nm | 12-22 nm | 21 nm |
| $SiO_x$ | 70-130 nm | 89-109 nm | 105 nm |

In this example, the medium index layer comprising silicon oxynitride and may have an index of refraction of from about 1.65 to 2.0 at 380 nm, 550 nm, and 780 nm wavelengths; the high index layer may have an index of refraction of at least about 2.0 at 380 nm, 550 nm, and 780 nm wavelengths; and the low index layer may have an index of refraction of from about 1.4 to 1.6 at 380 nm, 550 nm, and 780 nm wavelengths. In certain instances, the medium index layer has compressive residual stress after heat treatment. The layer stack may be arranged in a medium/high/low index arrangement in certain example embodiments.

Figure 5:
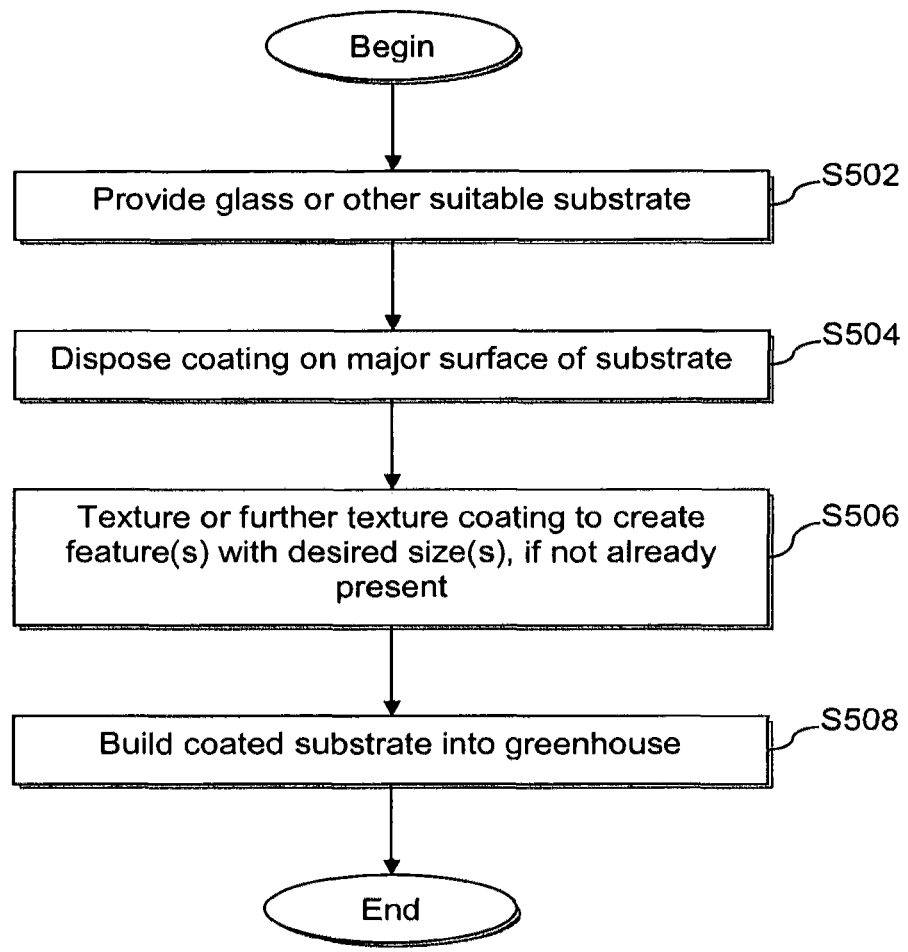
FIG. 5 is a flowchart illustrating an example process for making the coated articles of certain example embodiments.

FIG. 5 is a flowchart illustrating an example process for making the coated articles of certain example embodiments. A glass or other suitable substrate is provided in step S502. A coating is disposed on a major surface of the substrate in step S504. As indicated above, the coating may be disposed on the substrate via any suitable technique including, for example, pyrolytic deposition techniques, sputter deposition, and/or the like. The coating may be a single layer coating (which itself may be crystalline or polycrystalline) or a multilayer coating (of or include the same or different layers), and the layer(s) in the coating may be doped or undoped. Example materials include zinc oxide, tin oxide, and/or the like. In step S506, the coating may be textured or further textured (e.g., if it has a natural texture by virtue of the particular deposition process, for example) to create feature(s) with the desired size(s), if such features are not already present, e.g., because of the particular technique used in forming the coating. Texturing may be accomplished via chemical agents, through mechanical means such as sandblasting or the like, via ion beam treatment or milling, etc. Before and/or after the texturing/further texturing step S506, one or more optional inspection steps (not shown in FIG. 5) may be performed to determine whether an appropriate surface morphology has been provided. Corrective measures may be put into place, if necessary. In step S508, the coated article with the proper feature(s) may be built into a greenhouse or greenhouse application.

In example embodiments where a four-layer AR coating is provided, an "index-matching" and/or "stress-reducing" layer may be provided closest to the substrate. Such an index-matching and/or stress-reducing layer may comprise a material with a refractive index substantially matching that of a glass substrate. In this regard, "substantially matches" means that the refractive index of the layer is within about 0.2 of the refractive index of the glass substrate, more preferably within about 0.1, and most preferably the difference is no greater than about 0.05 or 0.04. Suitable materials may include, for example, silicon oxide and/or silicon oxynitride.

The coated articles may in certain example embodiments be incorporated into insulating glass (IG) units, e.g., where a coated article is spaced apart from another substrate and where a spacer system is provided around the periphery of the unit so as to help maintain the substrates in substantially parallel spaced apart relation to one another while also maintaining a seal therebetween. In such cases, the coating may be provided on any suitable surface (such as, for example, any one or more of surfaces 1-4 in an IG unit with two substrates, any one or more of surfaces 1-6 in an, IG unit with three substrates, etc.). The coated articles herein may in certain example embodiments be laminated to another substrate. As with the IG unit example, the coating may be provided on any suitable surface (such as, for example, any one or more of surfaces 1-4).

Wet etchants may be used in certain example embodiments. Such wet etchants may include weak acids including, for example, acetic acid, diluted acetic acid, various concentrations of hydrochloric acid (HCl), and the like. Of course, other acid etchants may be used in different example implementations. In certain instances, the weak acid may be any acid having a pH of from about 1 to 6, more preferably from about 2 to 5, and most preferably from about 2.5 to 4.5.

The character of the textured surface (e.g., the feature size) may be selected and/or controlled so as to enhance the scattering effect of light at a particular wavelength, with the wavelength (and thus feature size) being selected based on the material of the coating 202. Accordingly, by selecting and/or controlling the size(s) of the feature(s) of the textured surface, harmful wavelengths of light may be scattered away from plant life whereas beneficial wavelengths of light may pass through or be scattered in a diffuse manner towards the plant life.

In certain example embodiments, double-agent etchants may be used, advantageously resulting in a texturing of the coating that has different types of feature sizes. This may be advantageous to scatter harmful wavelengths of light away from plant life while also specifically focusing beneficial wavelengths of light at the plant life. Thus, in certain example embodiments, using double-agent etchants and/or more than one type of etchant may advantageously produce a layer with more than one type of feature size. The double-agent etchant, in certain example embodiments, may comprise dilute acetic acid (e.g., $CH_3COOH$) and ammonium chloride (e.g., $NH_4Cl$). In certain example embodiments, the dilute acetic acid and ammonium chloride may be in an aqueous solution. A double-agent etchant comprising dilute acetic acid and ammonium chloride may be used for etching the layer. The addition of the ammonium chloride may improve the size and smoothness of the features on the textured surface and may also result in the formation of a wider distribution of feature sizes in certain example embodiments. In certain example embodiments, the ratio of ammonium chloride to acetic acid in an aqueous solution ranges from (0.1-5%) NH4Cl to (0.5-10%) $CH_3COOH$.

In certain example embodiments, the surface of the coating 202 may be textured using a mixture of dilute acetic acid and phosphoric acid. The phosphoric acid may be dilute, as well, in certain instances. In certain example embodiments, the ratio of phosphoric acid to acetic acid in an aqueous solution ranges from (0.1-5%) $H_3PO_4$ to (0.5-10%) $CH_3COOH$.

Acetic acid as a primary etchant has been found to be advantageous in certain example embodiments because of its processability. Indeed, acetic acid has a wider process window, scales well, and has a reduced sensitivity to temperature changes (e.g., in a 30-40 degrees C. example range)—especially as compared to HCl. Because acetic acid scales well, it may be used over larger substrates. In addition, because it is a comparatively mild acid, it does not have to be diluted to a very low concentration which often is difficult to perform and control, e.g., when closed loop processing is performed. It also may be comparatively less harmful, easier to remove salts and/or other byproducts, etc.

As used herein, the terms "on," "supported by," and the like should not be interpreted to mean that two elements are directly adjacent to one another unless explicitly stated. In other words, a first layer may be said to be "on" or "supported by" a second layer, even if there are one or more layers therebetween.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A coated article, comprising:
a coating supported by a glass substrate,
wherein the coating includes at least one thin-film layer that is textured so as to have surface features on the order of 0.3-3 microns that cause (a) light having a wavelength of greater than 800 nm incident thereon to primarily scatter to angles less than 20 degrees relative to a major surface of the substrate and (b) light having a wavelength of less than 800 nm incident thereon that passes through the coated article to primarily scatter to angles greater than 20 degrees relative to the major surface of the substrate.

2. The coated article of claim 1, wherein the at least one thin-film layer has a refractive index (n) of 1.8-2.2 (at 550 nm).

3. The coated article of claim 1, wherein the at least one thin-film layer has a refractive index (n) of 1.9-2.1 (at 550 nm).

4. The coated article of claim 1, wherein the at least one thin-film layer is crystalline.

5. The coated article of claim 1, wherein the at least one thin-film layer comprises zinc oxide and/or tin oxide.

6. The coated article of claim 5, wherein the at least one thin-film layer is not doped.

7. The coated article of claim 5, wherein the at least one thin-film layer is 200-1,000 nm thick.

8. The coated article of claim 5, wherein the at least one thin-film layer is 300-500 nm thick.

9. The coated article of claim 8, wherein the coated article has a total solar transmission of at least about 85%.

10. The coated article of claim 8, wherein the coated article has a total solar transmission of at least about 90%.

11. A coated article, comprising:
a coating supported by a substrate,
wherein the coating includes at least one crystalline or polycrystalline thin-film layer that is textured so as to have micron- and/or sub-micron surface features that cause (a) light having a wavelength of greater than 800 nm incident thereon to primarily scatter to angles less than 20 degrees relative to a major surface of the substrate and (b) light having a wavelength of less than 800 nm incident thereon that passes through the coated article to primarily scatter to angles greater than 20 degrees relative to the major surface of the substrate.

* * * * *